US009060020B2

(12) United States Patent
Iekel-Johnson et al.

(10) Patent No.: US 9,060,020 B2
(45) Date of Patent: Jun. 16, 2015

(54) ADJUSTING DDOS PROTECTION BASED ON TRAFFIC TYPE

(71) Applicants: Scott Iekel-Johnson, Ann Arbor, MI (US); Aaron Campbell, Hammond Plains (CA); Lawrence Bruce Huston, III, Ann Arbor, MI (US); Brian Moran, Atlanta, GA (US); Jeff Edwards, Grass Lake, MI (US); Marc Eisenbarth, Pflugerville, TX (US); Jose Oscar Nazario, Ann Arbor, MI (US)

(72) Inventors: Scott Iekel-Johnson, Ann Arbor, MI (US); Aaron Campbell, Hammond Plains (CA); Lawrence Bruce Huston, III, Ann Arbor, MI (US); Brian Moran, Atlanta, GA (US); Jeff Edwards, Grass Lake, MI (US); Marc Eisenbarth, Pflugerville, TX (US); Jose Oscar Nazario, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 66 days.

(21) Appl. No.: 13/869,691

(22) Filed: Apr. 24, 2013

(65) Prior Publication Data
US 2014/0325634 A1    Oct. 30, 2014

Related U.S. Application Data

(60) Provisional application No. 61/807,157, filed on Apr. 1, 2013.

(51) Int. Cl.
*H04L 29/06*    (2006.01)

(52) U.S. Cl.
CPC .......... *H04L 63/1458* (2013.01); *H04L 63/101* (2013.01)

(58) Field of Classification Search
CPC .................................................. H04L 63/0236
USPC ............................................................ 726/13
See application file for complete search history.

(56) References Cited

U.S. PATENT DOCUMENTS

| 8,635,284 | B1 * | 1/2014 | Tripathi et al. | 709/206 |
| 2002/0166063 | A1 * | 11/2002 | Lachman et al. | 713/200 |
| 2008/0320119 | A1 * | 12/2008 | Achan et al. | 709/222 |

FOREIGN PATENT DOCUMENTS

| WO | WO2013156220 | * | 3/2013 | H04L 29/06 |

* cited by examiner

*Primary Examiner* — Kambiz Zand
*Assistant Examiner* — Thanh Le
(74) *Attorney, Agent, or Firm* — Locke Lord LLP; Scott D. Wofsy; Christopher J. Capelli

(57) ABSTRACT

A system, method and computer readable storage medium that receives traffic/packets from external devices attempting to access protected devices in a protected network. A determination is made to whether a received packet belongs to one of a plurality of packet classifications. Each packet classification indicative of different classes of IP traffic. Countermeasures are applied to a received packet to prevent attack upon the protected devices. Applying a countermeasure to a received packet determined to belong to one of the plurality of packet classifications includes countermeasure modification/selection contingent upon the determined packet classification for the received packet.

20 Claims, 2 Drawing Sheets

ADJUSTING DDOS PROTECTION BASED ON TRAFFIC TYPE

CROSS REFERENCE TO RELATED APPLICATIONS

This application claims priority to U.S. patent application Ser. No. 61/807,157 filed Apr. 1, 2013 which is incorporated herein by reference in its entirety.

FIELD OF THE INVENTION

The present invention relates generally to computer networks, and specifically to methods and systems for protecting against denial of service attacks in computer networks by adjusting attack countermeasures contingent upon traffic type.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

The architecture of the Internet makes networks and network devices vulnerable to the growing problems of DDoS attacks. Therefore, the ability to avoid or mitigate the damages of a DDoS attack, while preventing blocking of valid hosts, is advantageous to devices located in a protected network.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages and in accordance with the purpose of the invention, as embodied, the invention includes, a system method and computer readable storage medium in which an aspect of the invention includes mitigating DDoS attacks by identifying specific types of hosts that could be incorrectly blocked and apply/modify countermeasures/policies (examples of such countermeasures are provided further below) to traffic from such hosts to reduce the occurrence of such false positives.

In one embodiment, traffic/packets are received from external devices attempting to access protected devices in a protected network. A determination is made as to whether a received packet belongs to one of a plurality of packet classifications. Each packet classification indicative of different classes of IP traffic. Countermeasures are applied to a received packet to prevent attack upon the protected devices. Applying a countermeasure(s) to a received packet determined to belong to one of the plurality of packet classifications includes modification/selection of countermeasures contingent upon the determined packet classification for the received packet.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
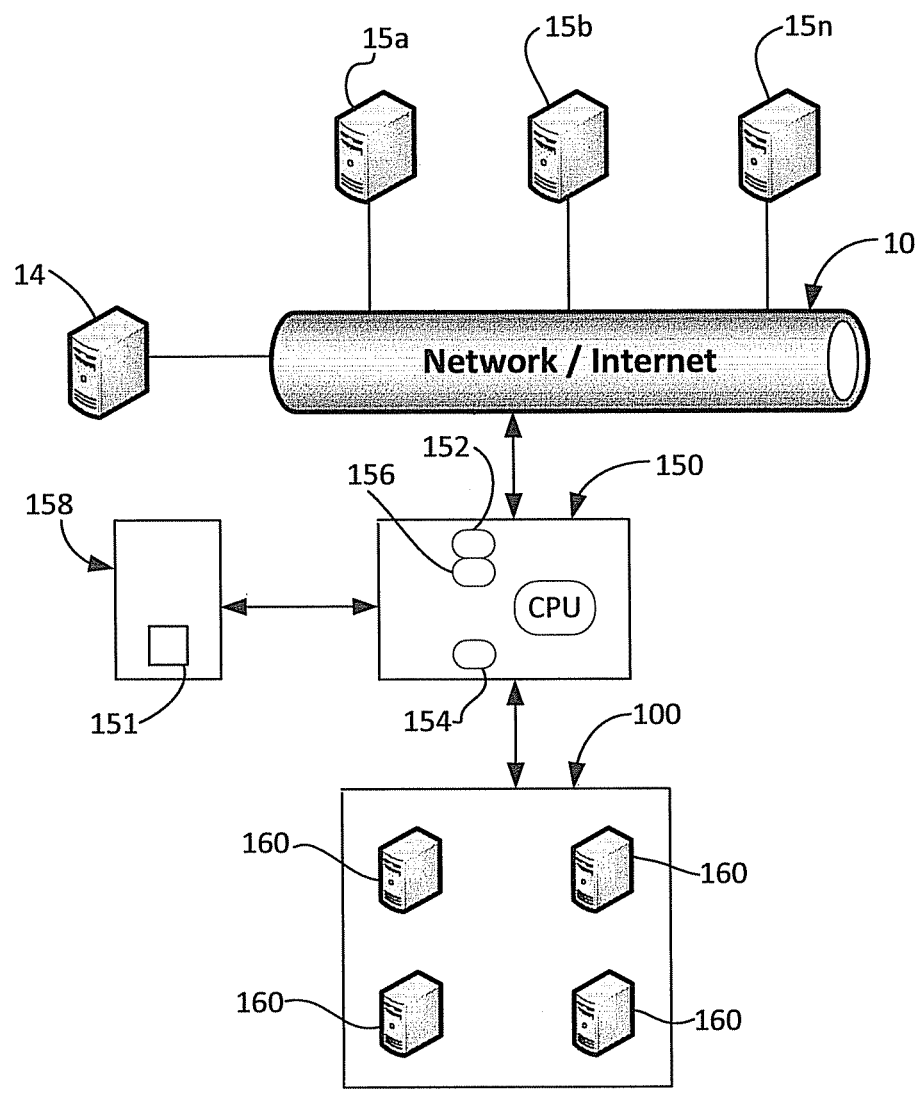
FIG. 1 illustrates an exemplary network communications system, in which an embodiment of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

It is to be further understood the illustrated embodiments of the present invention describe a system, apparatus and method for avoiding and mitigating the harmful effects of a Distributed Denial of Service ("DDoS") attack on a computer system/device or network. An ordinary denial of service attack, or DoS attack, may be defined as an attack by an offensive external device on a network device such as network routers, Internet servers, electronic mail servers, Domain Name System servers, etc. Such an attack may cause a loss of service to the network users due to a consumption of network bandwidth or an overload of system resources. The DDoS attack is an enhanced DoS attack in which multiple offensive devices coordinate a simultaneous attack upon a single targeted network device.

Turning now descriptively to the drawings, in which similar reference characters denote similar elements throughout the several views, FIG. 1 illustrates the relationship between the protected network 100, protection system 150, Internet 10, and external host devices 15a, 15b . . . 15n.

In a typical implementation, the external host devices 15a, 15b . . . 15n (also referred to as external devices or host devices) attempt to connect to protected devices 160 within a protected network 100 typically via a private network or a public computer network such as the Internet 10. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 10 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network, traffic is diverted to the protection system 150.

The protection system 150 preferably includes a packet processing system preferably having an external high speed network interface 152 and a protected high-speed network interface 154. Typically, these interfaces are capable of handling 1.5-40 Gbps, for example. System 150 may further include processors 156 that preferably process the packets received at interfaces 152 and 154. Additionally, a central processing unit (CPU), random access memory (RAM), and a storage medium 158 are preferably connected through buses and are used to further support the processing of the received packets. Computer code is preferably stored in the storage medium and executed by the CPU. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory. The storage medium 158 also preferably stores the host tables 151 used in the below described authenticated process of external device hosts 15a, 15b . . . 15n as well as other possible information such as predefined filter rules.

In a typical implementation, the protection system 150 authenticates all external host devices 15a, 15b . . . 15n before allowing the external devices to access the protected devices 160 within the protected network 100.

During an attack, the protection system 150 seeks to distinguish between attack traffic 14 and traffic made by legitimate host devices 15a, 15b . . . 15n by analyzing traffic to determine traffic (packet) classifications which are subsequently used to determine countermeasures (preferably of varying severity to mitigate attack), which are to be applied to received packets in the traffic, prior to accessing the protected devices 160 within the protected network 100. Thus, a goal of the protection system 150 is to selectively apply/modify one or more countermeasures to a determined traffic class/category to prevent traffic 14 from malicious devices from accessing the protected network 100.

It is to be understood and appreciated countermeasures are various defense mechanism's formatted to target and remove egregious attack traffic while permitting a network to continue operating wherein different countermeasures are designed to stop different types of attack traffic. Countermeasures are typically categorized as Raw and Event Driven countermeasures in which Raw countermeasures are preferably applied to each packet that transmits through a protection system 150. In contrast, Event Driven Countermeasures are not applied to each packet that transmits through a protection system 150. A protection system 150 preferably identifies the traffic stream with an application ID before an Event Driven countermeasure is applied wherein a protection system 150 may re-assemble a traffic stream (can be multiple packets) and notifies the appropriate countermeasure to inspect the traffic stream.

For purposes of the present invention, Raw countermeasures may include (but are not limited to): Global Exception (e.g., a global exception list) and Black/White Listing (e.g., identifies which traffic will be immediately dropped and which traffic will be automatically passed without further scrutiny); Zombie Removal (e.g., source addresses (hosts) that exceed a pps or bps threshold are blacklisted and all packets from them are dropped until they fall below a threshold rate); TCP SYN Authentication (e.g., system 150 intercepts all new inbound TCP session to verify they are not SYN floods wherein system 150 responds to a TCP SYN with a SYN ACK preferably having a unique sequence number such that the host responds with the unique sequence number +1 to authenticate the session. System 150 then preferably resets the session enabling the host to establish new sessions directly with the server until it meets an Idle timeout); DNS Authentication (e.g., used to block randomized UDP DNS floods whereby system 150 drops a first DNS request from a host and if the host re-transmits the request, system 150 marks the host as valid and permits passage of the request—once validated, all subsequent DNS requests from that host pass through until no DNS requests are detected from that host for an authentication period timeout); TCP Connection Reset (e.g., system 150 monitors TCP sessions and resets them if they remain idle for a TCP connection idle timeout period wherein an offending host is preferably temporarily blacklisted (e.g., 5 minutes)); Payload Regex Filtering (e.g., if a packet matches a destination port and the payload matches a regular expression, the packet is dropped); Baseline Enforcement (e.g., the system 150 preferably conducts two types of enforcement, 1) bandwidth enforcement and 2) protocol enforcement)); Malformed DNS Filtering (payload only) (e.g., detection is preferably performed on packets transmitted over DNS ports (e.g., TCP 53 and UDP 53) wherein any UDP ports 53 packets containing no payload are dropped and decoded DNS packets not formed properly are also dropped); SIP Malformed (e.g., payload check only); and Rate Limiting (e.g., all traffic exceeding prescribed threshold rates for Bits Per Second (BPS) and Packets Per Second (PPS) are dropped).

With regards to Event Driven countermeasures, they may include (but are not limited to): Malformed DNS Filtering (e.g., detection is only performed on packets transmitted over the DNS ports (TCP and UDP 53) whereby any UDP port 53 packet containing no payload are dropped and decoded DNS packets not formed properly are also dropped); Malformed HTTP Filtering (e.g., packets must preferably conform to RFC2616 Section 2.2 "Basic Rules with the exception of permitting the ""' character such that hosts are monitored to verify that the HTTP headers are properly formed); HTTP Object and Request Rate Limiting (e.g., limits the number of requests per second a single client can request and limits the number of objects per second a single client can request whereby an offending host is preferably blacklisted for a prescribed time period (e.g., five minutes)); HTTP Regex Filtering (e.g., the HTTP Header Regex is a regular expression that system 150 preferably applies separately to each line of any HTTP header or HTTP request that enter a mitigation process whereby if either the request or any line of the header matches the expression, the packet is dropped whereby an offending host is preferably blacklisted for a prescribed time period (e.g., five minutes)); Malformed SIP Filtering; and SIP Rate Limiting (e.g., any UDP SIP packets containing no payload are dropped and improperly formed packets are dropped and an offending host is preferably blacklisted for a prescribed time period (e.g., five minutes)).

Figure 2:
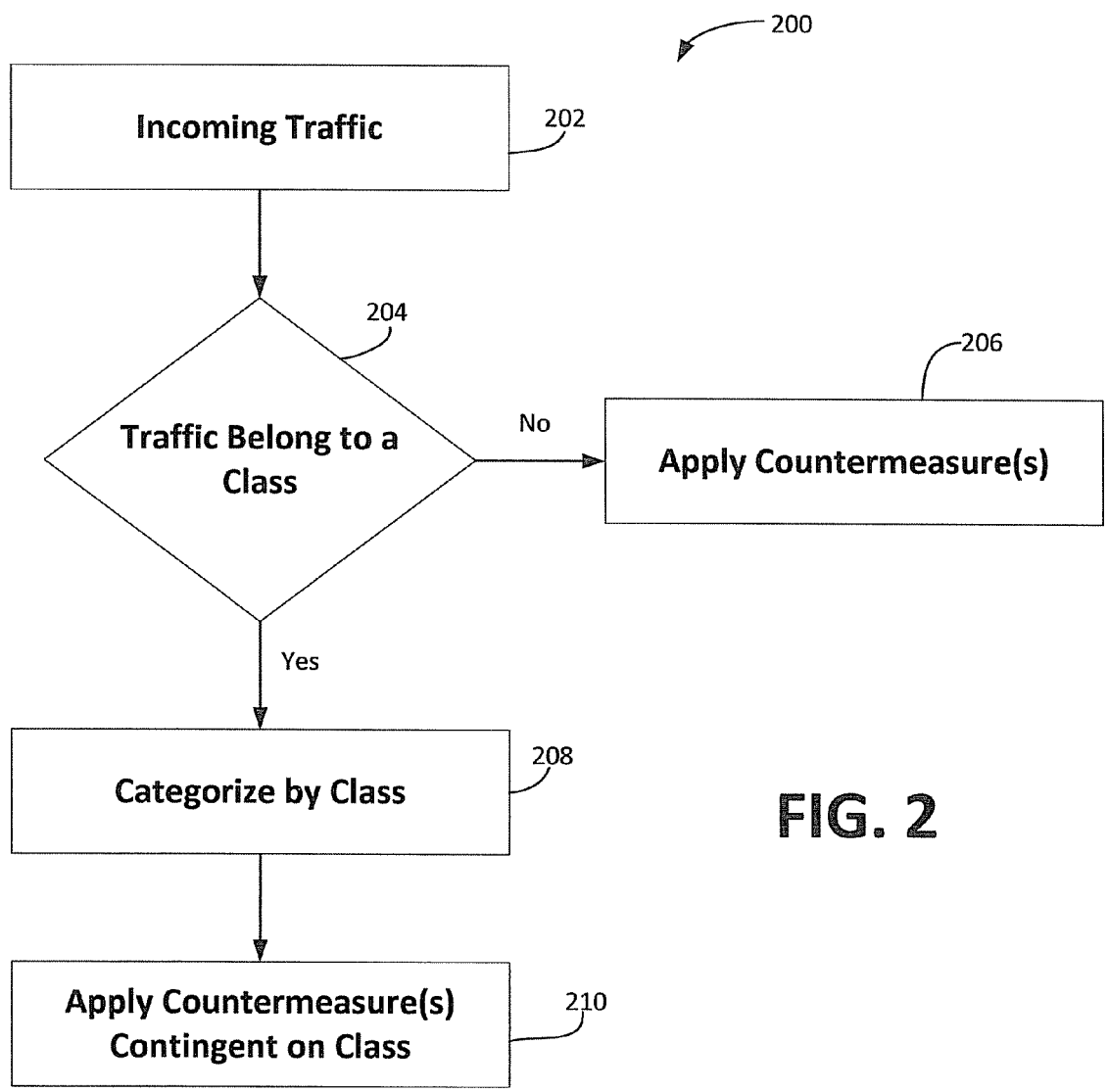
FIG. 2 illustrates an exemplary method for protecting against a denial of service attack according to the present invention.

FIG. 2 shows an illustrative method 200 for enabling protection system 150 to protect against a DDoS attack through selective treatment of network traffic. It should be noted that throughout this description, it has been assumed that the system and method of the present invention uses a single provider edge router (PE) router to protect against a DDoS attack. However, it may be that there is a plurality of PE routers within the network that may functionally cooperate to perform the method of the present invention. For example, a network may include a plurality of PE routers and all of the PE routers are implemented within an exemplary network of the present invention.

The method begins with step 202 where traffic (e.g., a data packet) is received by the protection system 150. The traffic is then preferably analyzed by the protection system 150 (preferably via the CPU) to determine if the traffic belongs to any one of a plurality of traffic/packet classifications preferably prescribed in storage medium 158, step 204. Examples of traffic classifications are provided further below. If the traffic is determined to belong to a prescribed traffic classification, it is accordingly categorized in step 208.

If the traffic in step 204 is determined not to belong to one of the aforesaid prescribed traffic/packet classifications, a prescribed set of countermeasures and policy is applied to the packet, step 206. For instance, such countermeasures and policy can include blacklisting the packet with regards to obtaining access to a protected device 160 in the protected network 100.

If the traffic in step 204 is determined to belong to one of the aforesaid prescribed traffic/packet classifications, then one or more countermeasures is applied to the traffic according to the determined packet classification for the packet, step 210. It is to be understood that modifications may be made to the countermeasures contingent upon the determined packet classification, which modifications may include skipping specific countermeasures, not blacklisting addresses, etc.

For instance, protection system 150 may be operational in step 204 to search the HTTP headers in received traffic to determine if the traffic host is indeed a proxy. And if it is determined a proxy, the traffic/packet is classified as proxy traffic in step 208 whereupon in step 210 the countermeasures are modified, and or selected, so as to exclude blacklisting (it is preferred not to blacklist proxies because many hosts can be behind the proxy, for instance, one bad host behind a proxy could prevent access by the good clients behind the same proxy). It is also to be understood and appreciated that some of the countermeasures prescribed in system 150 will likewise not be evaluated in this instance because they are determined not to be applicable to proxies.

In yet another example, when it is determined in step 204 that received traffic has IP addresses associated with search engine web crawlers (e.g., GOOGLE™, YAHOO™, BING™, etc.), the traffic/packet is classified as web crawler traffic in step 208. Thereafter in step 210 the countermeasures are modified to eliminate application of any countermeasures known to be problematic with web crawler traffic.

In still another example, storage medium 158 preferably contains a list of IP addresses that are known to have exhibited questionable behavior (preferably based upon previous analysis/determination), such that when it is determined in step 204 that received traffic has IP addresses matching the aforesaid "questionable behavior" IP addresses listed, protection system 150 in step 208 classifies this traffic as "questionable" in step 208. Thereafter, protection system 150 preferably applies additional countermeasures to this "questionable" traffic in step 210 to prevent attack upon devices 160 in the protected network 150.

With the illustrative embodiments of the invention described above, it is to be appreciated the above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention. The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. A method performed by a computer system having one or more processors and memory storing one or more programs for execution by the one or more processors for handling requests to a protected network, comprising:
   receiving packets from external devices attempting to access protected devices in the protected network;
   determining if the received packets belong to one of a plurality of packet classifications with each packet classification indicative of different classes of IP traffic; and
   selectively applying at least one of a first or second category of countermeasures to the received packets to prevent attack upon the protected devices, wherein countermeasures belonging to the first category are applied to the received packets on an individual basis and countermeasures belonging to the second category are applied to a stream of the received packets, wherein the first category comprises a plurality of raw countermeasures and the second category comprises a plurality of event driven countermeasures and wherein applying a countermeasure to a received packet or to a received stream of packets determined to belong to one of the plurality of packet classifications is contingent upon the determined packet classification for the received packet.

2. A method as recited in claim 1, wherein a first category countermeasure includes blacklisting an IP address of a received packet contingent upon packet classification.

3. A method as recited in claim 1, wherein the step of determining if a received packet belongs to one of a plurality of packet classifications includes analyzing the HTTP header of the packet to determine if an external device sending the packet is a proxy.

4. A method as recited in claim 3, wherein a first category countermeasure excludes blacklisting if it is determined the external device of the received packet is a proxy.

5. A method as recited in claim 1, wherein the step of determining if a received packet belongs to one of a plurality of packet classifications includes determining if an IP address associated with the received packet is associated with a web crawler.

6. A method as recited in claim 1, wherein the step of determining if a received packet belongs to one of a plurality of packet classifications includes determining if an IP address associated with the received packet matches with IP addresses previously identified to be associated with malicious behavior.

7. A method as recited in claim 1, wherein the method is running on a network protection device located between an external network and the protected network.

8. A method as recited in claim 1, wherein the external devices are located within different external networks.

9. A system for handling requests to a protected network, comprising:
   a memory;
   a processor disposed in communication with said memory, and configured to issue a plurality of instructions stored in the memory, wherein the instructions issue signals to:
      receive packets from external devices attempting to access protected devices in the protected network;
      determine if the received packets belong to one of a plurality of packet classifications, each packet classification indicative of a certain threat level; and
      selectively apply at least one of a first or second category of countermeasures to the received packets to prevent attack upon the protected devices, wherein countermeasures belonging to the first category are applied to the received packets on an individual basis and countermeasures belonging to the second category are applied to a stream of the received packets, wherein the first category comprises a plurality of raw countermeasures and the second category comprises a plurality of event driven countermeasures and wherein applying a countermeasure to a received packet or to a received stream of packets determined to belong to one of the plurality of packet classifications is contingent upon the determined packet classification for the received packet.

10. A system as recited in claim 9, wherein a first category countermeasure includes blacklisting an IP address of a received packet contingent upon packet classification.

11. A system as recited in claim 9, wherein the processor is further configured to issue signals to analyze the HTTP header of the packet to determine if an external device sending the packet is a proxy.

12. A system as recited in claim 11, wherein a first category countermeasure excludes blacklisting if it is determined the external device sending the packet is a proxy.

13. A system as recited in claim 9, wherein the processor is further configured to issue signals to determine if an IP address associated with the received packet is associated with a web crawler.

14. A system as recited in claim 9, wherein the processor is further configured to issue signals to determine if an IP address associated with the received packet matches with an IP address previously identified to be associated with malicious behavior.

15. A non-transitory computer readable storage medium and one or more computer programs embedded therein, the computer programs comprising instructions, which when executed by a computer system, cause the computer system to:

receive packets from external devices attempting to access protected devices in the protected network;

determine if the received packets belong to one of a plurality of packet classifications, each packet classification indicative of different classes of IP traffic; and selectively apply at least one of a first or second category of countermeasures to the received packets determined to belong to one of the plurality of packet classifications, wherein countermeasures belonging to the first category are applied to the received packets on an individual basis and countermeasures belonging to the second category are applied to a stream of the received packets, wherein the first category comprises a plurality of raw countermeasures and the second category comprises a plurality of event driven countermeasures and wherein the applied countermeasure is contingent upon the determined packet classification for the received packet.

16. A non-transitory computer readable storage medium as recited in claim 15, wherein a first category countermeasure includes blacklisting an IP address of a received packet contingent upon packet classification.

17. A non-transitory computer readable storage medium as recited in claim 15, wherein one or more of the computer programs cause the computer to issue signals to analyze the HTTP header of the packet to determine if an external device sending the packet is a proxy.

18. A non-transitory computer readable storage medium as recited in claim 17, wherein a first category countermeasure excludes blacklisting if it is determined the external device sending the packet is a proxy.

19. A non-transitory computer readable storage medium as recited in claim 15, wherein one or more of the computer programs cause the computer to determine if an IP address associated with the received packet is associated with a web crawler.

20. A non-transitory computer readable storage medium as recited in claim 15, wherein one or more of the computer programs cause the computer to determine if an IP address associated with the received packet matches with an IP address previously identified to be associated with malicious behavior.

* * * * *